July 29, 1941.  A. MAZER  2,250,892
TEAKETTLE
Filed July 29, 1939
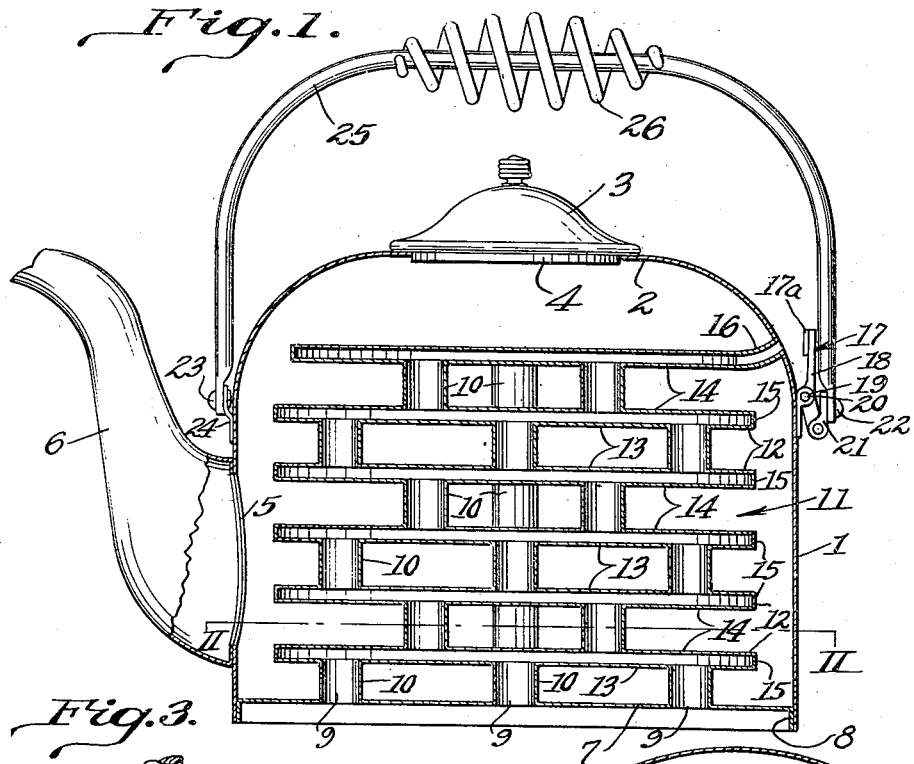
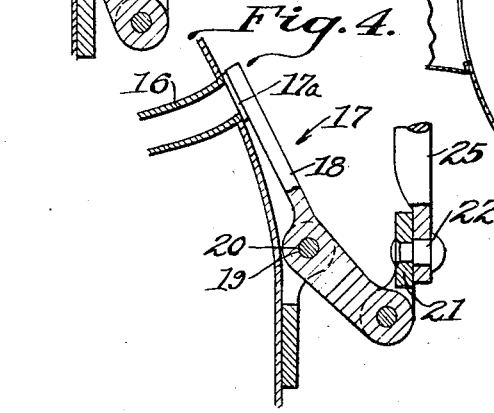
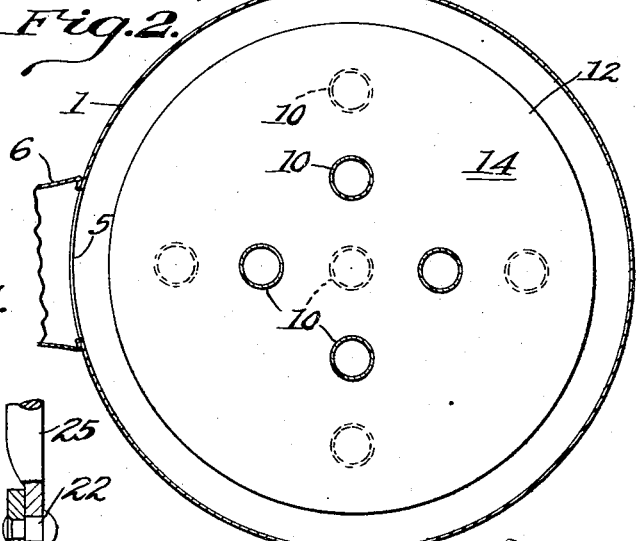
Inventor
Alfred Mazer
By W. S. McDowell
Attorney Patented July 29, 1941

2,250,892

UNITED STATES PATENT OFFICE 2,250,892

TEAKETTLE

Alfred Mazer, Newark, Ohio

Application July 29, 1939, Serial No. 287,345

4 Claims. (Cl. 53—9)

This invention relates to liquid heating vessels and is particularly directed to an improved teakettle for use in domestic kitchens.

The main object of the invention resides in the provision of a teakettle having an increased surface through which heat transfer can be effected in order to obtain greater efficiency and faster operation.

Another object rests in constructing a teakettle with a plurality of internal passages through which the products of combustion from the heating device such as a kitchen stove pass to procure a more extended period of contact between these gases and the material being heated.

An object also resides in interconnecting the above-mentioned passages in such a manner that a tortuous path will be traversed by the heated gases to still further extend the time of contact thereof with the fluid being heated.

A still further object may be found in providing the interior of a liquid receiving vessel with a plurality of vertically spaced drum members of shallow depth and forming connecting passages between the drum members by which communication will be established between the drums, the lowermost drum being connected with the atmosphere by passages extending through the bottom wall of the vessel, and the upper drum having an outlet extending to the atmosphere through the side of said vessel, the drum members providing increased heat transferring surface which will be engaged by the liquid contained within the vessel.

Another feature of importance in this invention may be found in providing the interiorly disposed drum assembly with a plurality of inlets for the heating fluid while only a single outlet of relatively small capacity is provided. This feature permits a continous circulation of heating fluid through the passages in the device but retards the flow to such an extent that substantially all the heat can be extracted from the heating medium.

Another advantage arising from this invention is secured through the provision of a cap member for closing the outlet leading from the radiator assembly disposed within the kettle when the kettle is lifted off the stove to remove the contents. This cap member is connected with the handle in such manner that the cap will be moved to a closed position by the weight of the kettle when a lifting force is applied to the handle.

A more complete understanding of the invention may be obtained from the following description and the accompanying drawing in which the invention has been illustrated in its preferred form.

In the drawing:

Fig. 1 is a vertical sectional view taken through a liquid heating vessel formed in accordance with the present invention;

Fig. 2 is a horizontal sectional view taken on the plane indicated by the line II—II of Fig. 1;

Fig. 3 is a detail vertical sectional view taken through a valve employed in closing the outlet from the radiator disposed interiorly of the vessel, the valve being shown in an open position;

Fig. 4 is a similar view showing the valve in a closed position.

Referring more particularly to the drawing, the numeral 1 designates the body of a liquid heating vessel. In this instance, the vessel has been illustrated as being a teakettle for use in domestic kitchens. The invention, however, is applicable to other heating vessels and is not limited to the type of vessel shown. The body 1 is substantially circular in horizontal cross section and at its upper end is turned inwardly to provide a top wall 2, the center of which is formed with an opening through which the contents to be heated may be placed in the interior of the vessel. Normally, this opening is closed by a removable lid 3 which has an annular depending flange 4 receivable by the opening to hold the cap on the vessel. One side of the vessel has an opening 5 in registration with which is permanently secured a pouring spout 6, the open end of the spout being disposed at substantially the same level as the upper end of the kettle to prevent liquid in the kettle from finding exit when the kettle is held level.

At its lower end, the body 1 is provided with a bottom wall 7 having a downwardly directed peripheral flange 8 employed in securing the bottom wall to the lower edge of the body. This arrangement spaces the bottom wall slightly above the lower edge of the body to provide a chamber in which heat from a stove on which the device is placed may be entrapped. While the kettle has been illustrated as having this open bottom chamber at its lower end, it is not entirely essential to the successful operation of the device, since the bottom wall may be formed flush with the lower end of the body without seriously affecting the operation of the kettle.

The bottom wall is provided with a plurality of spaced openings 9 and a short tube 10 is secured to the upper surface of the bottom wall in registration with each opening. These tubes support a radiator assembly designated generally by the numeral 11. This radiator is formed from a plurality of vertically spaced horizontally disposed drum members 12 which are each formed from a pair of circular plates 13 and 14 joined at their peripheries by a narrow annular wall 15. The plates 13 are provided with a plurality of openings, the spacing between the openings being identical with that between the openings in the bottom wall 7. The plates 14 are also formed with a plurality of openings but the spacing between these openings is different than that between the openings in the plates 13. The drums 12 are maintained in spaced relation by a plurality of short pipe sections corresponding to the sections 10 used in supporting the radiator on the bottom wall.

When the radiator is being assembled, the drums are so arranged that the opposed walls of adjacent sections are provided with openings having the same spacing. The tubes 10 are then secured to the walls and provide passages which connect or establish communication between the drums. By making each drum of walls having unequally spaced perforations and assembling the drums with the walls having similarly spaced perforations opposed to one another and connected by conduits, the passages leading to the drums are relatively offset with respect to the passages leading from the drums. This arrangement provides a plurality of tortuous passages through which the products of combustion will pass and a longer period of contact or heat exchange will be secured thereby.

The uppermost drum has an outlet opening formed in its peripheral wall and an outlet tube 16 leads from this opening to an opening formed in the side wall of the body 1. The tube 16 is considerably smaller in diameter than the tubular elements 10, the purpose of this difference in size being to retard the flow of heated gases from the radiator. Inasmuch as the radiator is vented by the outlet 16, the heated gases will pass into the radiator without restriction but due to the difference in size, will not pass from the radiator until the temperature has been lowered by the transfer of heat to the fluid in the vessel.

To prevent the escape of the heated gases from the radiator when the kettle is removed from the stove and consequent burning of the operator's hand or wrist, a valve member 17 is provided to close the outlet 16. In the form of the invention illustrated, this valve member comprises a lever 18 which is pivotally supported by the body as at 19 upon a horizontally disposed pin 20. The pin passes through the lever at a point intermediately of the ends, the upper end being provided with a valve disk 17a. The lower end of the lever pivotally supports a plate 21 from which a stud 22 laterally projects. This stud is in horizontal registration and alignment with a similar stud 23 carried at the opposite side of the body 1 by a plate 24 rigidly secured thereto. A bail 25 is mounted for swinging movement on the studs 22 and 23 and extends across the top of the vessel. By being pivotally secured to the body through the studs, this bail may be swung from one side of the kettle to the other or it may be disposed in a vertical position as disclosed in Fig. 1.

At its central portion, the bail 25 includes a handle 26 by means of which the operator may lift the kettle from the stove or other support. When the kettle is so elevated, the weight of the kettle and its contents will cause pivotal movement to be imparted to the lever 18 causing the valve 17 to move into engagement with the side wall of the vessel. Since the pivot for the lever is arranged adjacent the outlet leading from the radiator, the valve will close the outlet and prevent the escape of heated gases from the radiator while the kettle is supported by the bail member. As the gases are prevented from escaping from the radiator, cool air will not enter through the openings 9 in the bottom wall and it will then not be necessary to displace any cool air when the kettle is returned to its position on the stove. If the valve were not provided and cool air permitted to enter the radiator, this cool air would retard the flow of heated gases into the radiator and detract from the efficiency of the teakettle.

By supporting the radiator assembly entirely by the bottom wall, facility in the manufacture of the kettle is obtained since the radiator can be assembled on the bottom wall prior to the assembly of the latter member with the body 1. By making the radiator of a plurality of drum members composed of duplicative disk members, economy of production will also result and an improved liquid heating vessel will be secured. The radiator shown and described is characterized by the increased surface with which the fluid to be heated may contact. This is in marked contrast to similar devices heretofore proposed.

While the invention has been illustrated in but a single form, various modifications may be made therein without departing from the spirit and scope of the invention as set forth in the following claims.

What is claimed:

1. In a teakettle, a container, a handle for said container, means disposed in said container to provide a tortuous gas passage therein communicating at one end with the atmosphere through the bottom wall of said container, the other end of said passage communicating with the atmosphere through an upper wall, and closure means for the last-mentioned end of said passage, said closure means being connected with and operated by said container handle.

2. In a teakettle, a container, a handle for said container, means disposed within said container to provide a tortuous gas passage therein communicating with the atmosphere at one end through the bottom wall of the container and through the side wall at the other end, a lever pivotally supported by the container side wall adjacent the last-mentioned end of said passage, a valve disk carried by said lever for closing said passage in one position of movement of said lever, and means connecting said lever and said container handle whereby the former will hold said disk in a passage closing position when the container is supported by said handle.

3. In a teakettle, a container, means disposed in said container to provide a tortuous gas passage therein, said passage communicating at its lower end with the atmosphere through the bottom wall of the container and at its upper end through the side wall, a bracket member secured to said container side wall adjacent the upper end of said passage, a lever mounted for rocking movement on said bracket, a valve disk secured to said lever for movement to a passage closing position, and a handle pivotally connected with said container and said lever, said handle serving to move said lever to dispose said disk in a passage closing position.

4. In a teakettle, a container, a handle for said container, means disposed in said container to provide a tortuous gas passage therein communicating at one end with the atmosphere through the bottom wall of said container, the other end of said passage communicating with the atmosphere through an upper wall, and closure means for the last-mentioned end of said passage, said closure means being connected with said handle and moved to an operative position when the kettle is supported by said handle.

ALFRED MAZER.